United States Patent
De Jongh et al.

(10) Patent No.: US 11,057,973 B2
(45) Date of Patent: Jul. 6, 2021

(54) RETROFIT LED LIGHTING DEVICE HAVING IMPROVED TIMING EVENT DETECTION FOR INCREASING STABLE DRIVER OPERATION WITHOUT LIGHT FLICKER

(71) Applicant: SIGNIFY HOLDING B.V., Eindhoven (NL)

(72) Inventors: Frits Tobi De Jongh, Beek en Donk (NL); Haimin Tao, Eindhoven (NL); Dmytro Viktorovych Malyna, Achel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/640,094

(22) PCT Filed: Aug. 16, 2018

(86) PCT No.: PCT/EP2018/072212
§ 371 (c)(1),
(2) Date: Feb. 19, 2020

(87) PCT Pub. No.: WO2019/038175
PCT Pub. Date: Feb. 28, 2019

(65) Prior Publication Data
US 2021/0136893 A1 May 6, 2021

(30) Foreign Application Priority Data
Aug. 24, 2017 (EP) .................................... 17187619

(51) Int. Cl.
*H05B 45/37* (2020.01)
*H05B 45/3578* (2020.01)
*H05B 45/50* (2020.01)

(52) U.S. Cl.
CPC ......... *H05B 45/37* (2020.01); *H05B 45/3578* (2020.01); *H05B 45/50* (2020.01)

(58) Field of Classification Search
None
See application file for complete search history.

(56) References Cited

U.S. PATENT DOCUMENTS

| 4,461,990 A | 7/1984 | Bloomer |
| 2013/0221867 A1 | 8/2013 | Deppe et al. |

(Continued)

FOREIGN PATENT DOCUMENTS

| GB | 2540687 A | 1/2017 |
| WO | 2012052875 A2 | 4/2012 |

(Continued)

*Primary Examiner* — Anh Q Tran
(74) *Attorney, Agent, or Firm* — Daniel J. Piotrowski

(57) ABSTRACT

A retrofit Light Emitting Diode, LED, lighting device for connection to a ballast, wherein said ballast is arranged to provide for a ballast current, said retrofit LED lighting device comprising at least one LED for emitting light, a rectifier arranged for rectifying said ballast current and for providing a lamp current to said at least one LED, a shunt switch for shunting said at least one LED thereby preventing said lamp current to flow through said at least one LED, a control unit for controlling said shunt switch, wherein said control unit is arranged to detect a particular amplitude offset current level in one of said ballast current and said lamp current, said particular amplitude offset current level being a particular non-zero value of said ballast current or said lamp current and to activate said shunt switch triggered by said detection.

12 Claims, 7 Drawing Sheets

(56) References Cited

U.S. PATENT DOCUMENTS

2013/0320869 A1* 12/2013 Jans ................. H05B 45/14
                                                        315/186
2014/0320007 A1* 10/2014 Stamm ............... H05B 45/44
                                                         315/51
2018/0255626 A1*  9/2018 Deixler .............. H05B 45/14

FOREIGN PATENT DOCUMENTS

WO    2012110973 A1    8/2012
WO    2014009836 A2    1/2014

* cited by examiner

RETROFIT LED LIGHTING DEVICE HAVING IMPROVED TIMING EVENT DETECTION FOR INCREASING STABLE DRIVER OPERATION WITHOUT LIGHT FLICKER

CROSS-REFERENCE TO PRIOR APPLICATIONS

This application is the U.S. National Phase application under 35 U.S.C. § 371 of International Application No. PCT/EP2018/072212, filed on Aug. 16, 2018, which claims the benefit of European Patent Application No. 17187619.6, filed on Aug. 24, 2017. These applications are hereby incorporated by reference herein.

FIELD OF THE INVENTION

The present invention generally related to the field of lighting and, more specifically, to a retrofit Light Emitting Diode, LED, lighting device. The present invention further relates to a lighting system comprising a ballast and relates to a method of operating a retrofit LED lighting device.

BACKGROUND OF THE INVENTION

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED lamp is typically adapted to fit into the socket of the respective lamp fixture to be retrofitted. Moreover, since the maintenance of a lamp is typically conducted by a user, the retrofit LED lamp should ideally be readily operational with any type of suitable fixture without the need for re-wiring the fixture.

However, the existing systems operate with a ballast which is arranged to supply more power than is required for the retrofit LED lighting device.

A commonly used retrofit LED driver topology is a shunt switch for shunting the LEDs such that the amount of power from the ballast to the LEDs is reduced. A shunt switch may be implemented as a single switching element which partly short circuits the ballast output. Another known implementation comprises a dual switch element as a part of a diode bridge working as a synchronized rectifier.

In any of these cases, the timing and synchronizing of the short circuit, i.e. the control of the shunt switch, is of importance to have a stable driver operation without, for example, any light flickering. Conventionally, trigger events for controlling the shunt switch are generated using a zero-crossing detector, wherein the zero-crossing detector detects a zero-crossing in the current or voltage at the lamp driver input.

These detections may, however, become inaccurate when the ballast current is disturbed. False event detection may result in unacceptable driver and/or ballast operation. Further, interaction of the ballast and the driver may also result in unacceptable driver and ballast operation.

It is further noted that there are many parameters, especially for dimmable LED lighting devices which may influence the ballast current distortion, such as ballast type, working point of the ballast, system damping factor. All those parameters may change by the dimming light level setting.

SUMMARY OF THE INVENTION

It would be advantageous to achieve a retrofit Light Emitting Diode, LED, lighting device having an improved timing event detection thereby increasing stable driver operation without, for example, light flickering. It would also be advantageous to achieve a lighting system as well as a method of operating the LED lighting device.

To better address one or more of these concerns, in a first aspect of the invention, a retrofit LED lighting device for connection to a ballast is provided. The ballast is arranged to provide for a ballast current. The retrofit LED lighting device comprises:
at least one LED for emitting light;
a rectifier arranged for rectifying said ballast current and for providing a lamp current to said at least one LED;
a shunt switch for shunting said at least one LED thereby preventing said lamp current to flow through said at least one LED;
a control unit for controlling said shunt switch, wherein said control unit is arranged to:
  detect a particular amplitude offset current level in one of said ballast current and said lamp current, said particular amplitude offset current level being a particular non-zero value of said ballast current or said lamp current;
  activate said shunt switch triggered by said detection.

It was the insight of the inventors that the use of a zero-crossing detector for detecting zero-crossings in the lamp current or ballast current would not suffice due to irregularities that occur around the zero current threshold. As such, the inventors have found that trigger events should be generated by detecting that the ballast current or the lamp current crosses a particular amplitude offset current level, wherein the particular amplitude offset current level is a particular non-zero value of the ballast current or the lamp current.

The above increases the probability that stable triggers are generated for controlling the shunt switch. Such a stable operation reduces the probability for light flickering.

The LED lighting device comprises a rectifier which is arranged for rectifying the ballast current which is alternating in nature into a Direct Current, DC, lamp current.

A rectifier may comprise four switching elements. These switching elements may either be non-controllable—like a diode, or controllable—like a Metal Oxide Semiconductor Field Effect Transistor, MOSFET, Thyristor etc. For the purpose of the present disclosure, the switching elements are referred to as diodes, but it is noted that they may be replaced by other equivalent controllable or non-controllable switches with suitable additional control equipment where necessary.

The lighting device comprises at least one LED for emitting light. Preferably, one or more arrays of LEDs are used. Each array of LEDs may be controlled separately. For example, a first array of LEDs may emit white colored light. A second array of LEDs may emit blue colored light. A third array of LEDs may emit red colored light. A fourth array of LEDs may emit green colored light. By separately controlling each of the arrays, a particular color may be set for the lighting device.

As mentioned above, the shunt switch is arranged for shunting the at least one LED thereby preventing said lamp current to flow through said at least one LED. The shunt switch may be implemented as a single switch, for example a MOSFET, which switch is placed in parallel over the at least one LED. By activating the switch, a short circuit is generated such that the lamp current bypasses the at least one LED.

The shunt switch may also be implemented using the rectifier. That is, the rectifier may comprise one or more switches, which one or more switches may also be used as a shunt switch. This particular example is explained in more detail with reference to the figures.

The control unit is arranged to detect that the lamp current or the ballast current crosses a particular current level, i.e. a particular amplitude offset current level. Such an offset current level may be set once, for example in the factory, or may be an adaptive offset current level such that the offset current level may change over time.

As mentioned above, it was found that distortions in the ballast current and/or the lamp current often take place around the zero current threshold. As such, the present disclosure is directed to a method of creating triggers for the shunt switch, wherein the triggers originate from the detection that the lamp current or the ballast current crosses the particular current level, wherein that particular current level is non-zero. In such a way, it is more likely that the distortion does not influence the trigger creation process.

The control unit may be implemented in a digital fashion and/or in an analogue fashion.

The control unit may, for example, be a microcontroller or any other control device such as a microprocessor, a field programmable gate array, FPGA, or anything alike. The microcontroller may, for example, receive the relevant input signals at some of the available input pins and may be provide output control signals—to control the shunt switch, at other available output pins.

In an example, the rectifier is arranged to receive an oscillating ballast current, said lighting device further comprising:

an offset generation unit arranged for setting said particular amplitude offset such that said particular amplitude offset current level is between 5%-20%, more preferably between 5%-15%, even more preferably between 5%-10% of an amplitude of said oscillating ballast current.

The retrofit LED lighting device is suitable to be used as a retrofit device. This means that the lighting device is suitable to be connected to already existing lighting systems. These existing lighting systems were, originally, designed for, for example, fluorescent lamps. As such, these existing lighting systems comprise a ballast for providing a ballast current. The retrofit LED lighting device is designed in such a way that it can cope with the ballast.

The design of the retrofit LED lighting device may take into account the ballast current that is expected to be received from the ballast. That is, typically the ballast provides a predefined ballast current, having a predefined frequency and amplitude.

Following the above, the inventors have found that it may be beneficial in case the particular amplitude offset current level is, preferably, between 5%-10% of the amplitude of the oscillating ballast current.

In an example, the control unit is further arranged to activate said shunt switch triggered by, or upon, said detection and by taken into account a predefined delay time, wherein said predefined delay time is based on an expected time difference between 1) a zero-crossing of said ballast current or said lamp current and 2) an expected point in time in which said particular amplitude offset current level is detected.

The advantage of this particular example is that the actual trigger for the shunt switch is still roughly at about the zero-crossing of the ballast current or the lamp current. Firstly, it is detected that the lamp current or the ballast current crosses a particular current offset level. This is, of course, at a different moment in time than the zero-crossing itself. As such, secondly, the detected crossing is shifted in time to a moment in time at which the actual zero-crossing is expected. As such, the moment in time that the crossing of the particular current offset level is delayed with a predefined expected time difference such that the shunt switch gets triggered at about the actual zero-crossing of the ballast current or the lamp current.

In another example, there is provided a retrofit Light Emitting Diode, LED, lighting device for connection to a ballast, wherein said ballast is arranged to provide for a ballast current, said retrofit LED lighting device comprising:

at least one LED for emitting light;

a rectifier arranged for rectifying said ballast current and for providing a lamp current to said at least one LED;

a shunt switch for shunting said at least one LED thereby preventing said lamp current to flow through said at least one LED;

a control unit for controlling said shunt switch, wherein said control unit is arranged to:

generate trigger signals from the ballast current or the lamp current;

calculate an average period of said generated trigger signals, and activate said shunt switch based on said calculated average period thereby forcing said ballast to operate in a symmetrical mode.

It is noted that this example may be combined with any of the previously provided examples.

The above identified trigger signals may, for example, be generated using a zero-crossing detector arranged for detecting zero-crossings in the lamp current or the ballast current. Another option is that the identified triggers are generated by the non-zero crossing detector in accordance with the present disclosure. That is, the control unit may be arranged to detect a particular amplitude offset current level in one of said ballast current and said lamp current, said particular amplitude offset current level being a particular non-zero value of said ballast current or said lamp current.

Here, it was noted that shunt switch reference timing events may be shifted in time by interaction between the ballast and the driver. A small time reference time shift may result in a shunt switch time error. This may lead to an avalanched effect with a total disturbed timing. The example as provided above mitigates this drawback as the controlling of the shunt switch based on an average period of the generated trigger signals forces the ballast into a balanced situation.

In an example, the rectifier comprises two diodes in combination with two switches, wherein said control unit is arranged to control said two switches for rectifying said ballast current, and wherein said two switches are further arranged to operate as said shunt switch.

In a second aspect of the invention, there is provided a lighting system, comprising:

a retrofit LED lighting device in accordance with any of the previous claims, and a ballast connected to said retrofit LED lighting device.

It is noted that the advantages and definitions as disclosed with respect to the embodiments of the first aspect of the invention also correspond to the embodiments of the second aspect of the invention, being the lighting system.

Preferably, the lighting system comprises an electromagnetic, EM, ballast.

In a third aspect of the invention, there is provided a method of operating a retrofit LED lighting device in accordance with any of the examples as provided above, wherein said method comprises the steps of:

rectifying, by said rectifier, said ballast current and providing a lamp current to said at least one LED;

detecting, by said control unit, a particular amplitude offset current level in one of said ballast current and said lamp current, said particular amplitude offset current level being a particular non-zero value of said ballast current or said lamp current;

activating, by said control unit, said shunt switch triggered by said detection.

It is noted that the advantages and definitions as disclosed with respect to the embodiments of the first and second aspects of the invention also correspond to the third aspect of the invention, being the method of operating a retrofit LED lighting device.

In an example, the rectifier is arranged to receive an oscillating ballast current, and wherein said lighting device further comprises an offset generation unit, said method comprises the step of:

setting, by said offset generation unit, said particular amplitude offset such that said particular amplitude offset current level is between 5%-20%, more preferably between 5%-15%, even more preferably between 5%-10% of an amplitude of said oscillating ballast current.

In an example, the step of activating comprises:

activating, by said control unit, said shunt switch triggered by said detection and by taken into account a predefined delay time, wherein said predefined delay time is based on an expected time difference between 1) a zero-crossing of said ballast current of said lamp current and 2) an expected point in time in which said particular amplitude offset current level is detected.

In a further example, the method further comprises the step of:

calculating, by said control unit, an average period of said ballast current or said lamp current, and activating, by said control unit, said shunt switch based on said calculated average period thereby forcing said ballast to operate in a symmetrical mode.

In yet another example, the rectifier comprises two diodes in combination with two switches, wherein said control unit is arranged to control said two switches for rectifying said ballast current, and wherein said two switches are further arranged to operate as said shunt switch.

These and other aspects of the invention will be apparent from and elucidated with reference to the embodiment(s) described hereinafter.

DETAILED DESCRIPTION

Figure 1:
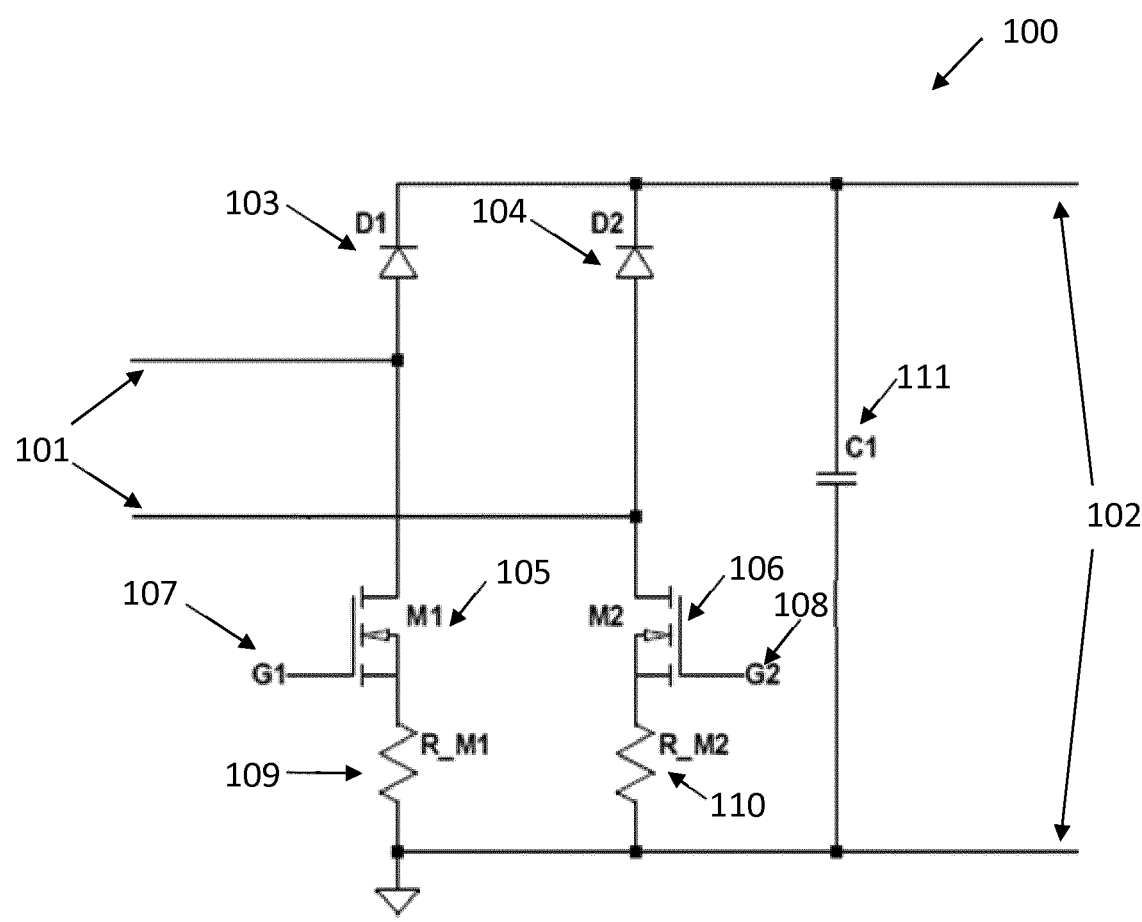
FIG. 1 shows a schematic circuit example of a synchronous rectifier in accordance with the prior art.

FIG. 1 shows a schematic circuit example of a synchronous rectifier in accordance with the prior art.

Reference number 100 indicates a synchronous rectifier as known in the prior art. The synchronous rectifier 100 receives at its input terminals 101 an alternating current, AC, and provides at its output terminals 102, a Direct current, DC, i.e. a lamp current. Typically, the input current provided at the input terminals 101 is an output current from the ballast, which is more conveniently referred to as the ballast current. Circuit components 103, 104, 105, 106 together comprise of a synchronous rectifier. A synchronous rectifier is alternatively referred to as an active rectifier. The working of a synchronous or an active rectifier is similar to the operation of a bridge rectifier except in that at least two of the diodes, in two different legs of the rectifier, are replaced by active controllable switching elements such as a transistor or a Metal Oxide Semiconductor Field Effect Transistor, MOS FET.

In the exemplary embodiment shown in FIG. 1, the two bottom diodes have been replaced by MOSFETs 105 and 106. Replacing a diode with an active, controlled switching element such as a MOSFET is the heart of active rectification. MOSFETs have a constant very low resistance when conducting, known as on-resistance. They can be made with an on-resistance as low as 10 mΩ or even lower. The voltage drop across the transistor is then much lower, meaning a reduction in power loss and a gain in efficiency. The amplitude of the output current at the output terminals, i.e. the lamp current, can be controlled by controlling the switching of the switchable elements, in this case, the MOSFETs as referred to with reference numerals 105,106.

The MOSFETs 105, 106 can be controlled by varying the signal at the respective gate terminals 107, 108. In addition, the resistors 109, 110 connected in series with the MOSFETs are sense resistors. They may be utilized if a voltage across the resistance needs to be compared for any control purposes. In addition, capacitor, 111 is a smoothing capacitor and improves the ripple factor of the output current at terminals 102.

Figure 2:
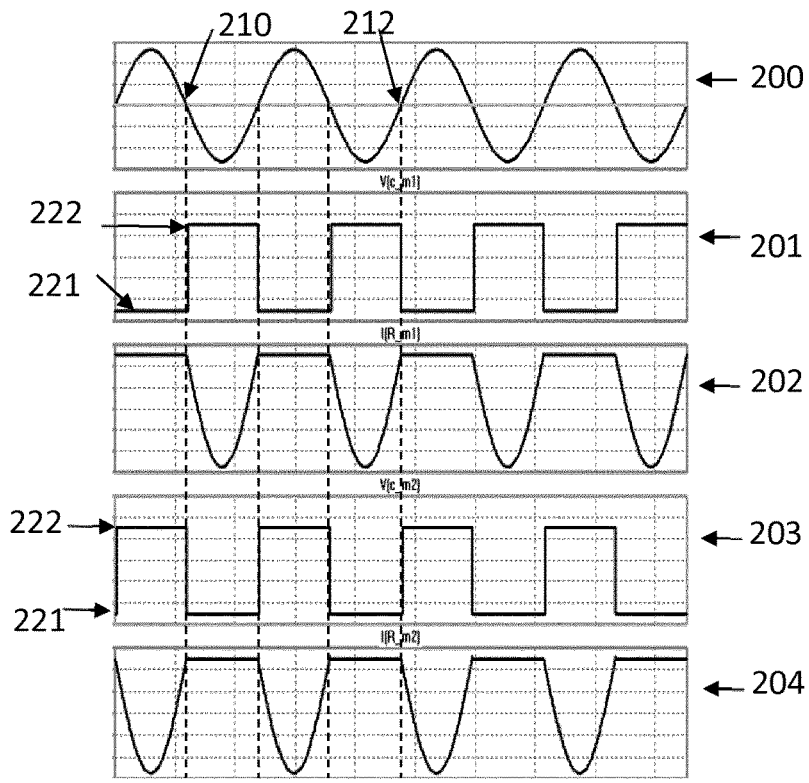
FIG. 2 shows the ballast current, the MOSFET gate signals and drain source currents.

It is noted that a shunt switch at the output of the rectifier can also be used to provide the same switching behavior as explained in accordance with the present disclosure. FIG. 2 shows the ballast current 200, the MOSFET gate signals 201, 203, and drain source currents 202, 204. Reference number 200 indicates an AC waveform such as that would be available at the input terminals 101 of a synchronous rectifier. Reference number 200 could also be referred to as the input current or the ballast current. All the plotted waveforms 200-204 show the variation of magnitude with respect to time. Within the ballast current waveform 200, points 210, 212 indicate the zero crossing point. In typical circuits, this serves as a good reference point to the control means and the controllable switch elements.

Reference numbers 201 and 203 respectively indicate the control signals to the two MOSFETs 105, 106, respectively, through the respective gate terminals 107, 108. The control signals 201, 203 are usually a digital signal that have a low state 221 and a high state 222. The low state 221 corresponds to an OFF position of the MOSFET and the high state 222 corresponds to an ON position of the MOSFET.

Reference numbers 202 and 204 respectively represent the current flowing through resistors 109,110. The current shown is to be negative as according to the present disclosure, a drain to source current in the MOSFET is considered to be positive. In this case, the current flows from the source to drain and hence is depicted as negative.

Figure 3:
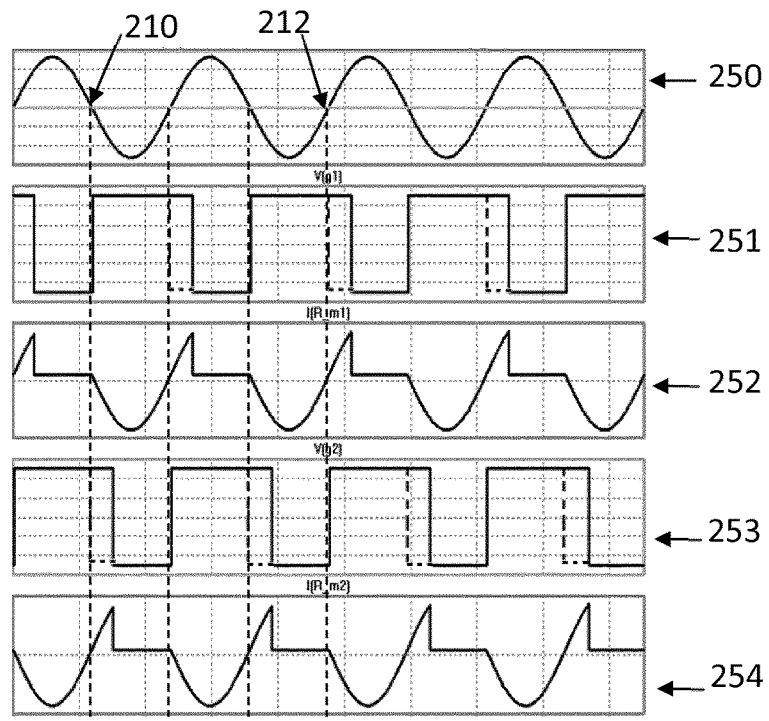
FIG. 3 shows a situation of reduced LED current owing to increased ON time of the switching elements.

FIG. 3 shows a situation of reduced lamp current owing to increased ON time of the switching elements. In common retrofit situations, it is often the case that the ballast is rated for a higher amount of power than the at least one Light Emitting Diode, LED to which it supplies power. Hence control elements often have to shunt some of the input power. One way of implementing is this by ensuring that both the MOSFETs 105,106 stay ON for a short period of time. During the period that both the MOSFETs are ON, the ballast is short circuited and the effective current to the at least one LED, i.e. the lamp current, is reduced.

Reference number 250 indicates a ballast current or an input current similar to the input current 200. Further, zero crossing points 210, 212 are also indicated as a reference. Similar to the waveforms shown in FIG. 2, waveforms 251 and 253 respectively represent the control signals available at the gate terminals 107, 108 of the MOSFETs 105, 106. The turn on time of MOSFET 105 corresponds with a positive to negative transition of the ballast current at the zero crossing point 210. Similarly, the turn on time of MOSFET 106 corresponds to a negative to positive transition of the ballast current at the zero crossing point 212. The duration for which the MOSFETS 105,106 stay ON once they are activated is either predetermined or may be controllable by other control means (not shown in figure). Corresponding to the increased ON time of the MOSFETs 105, 106, the MOSFETs remain conducting for a longer period thereby resulting in an overlap of current conduction through resistors 109,110. This can be seen from the waveforms 251, 252.

In both the cases, it is shown that the timing of the switching of the MOSFETs is determined by a zero current or a zero crossing event. Hence it may be advantageous to accurately determine a zero current or zero crossing event.

Figure 4:
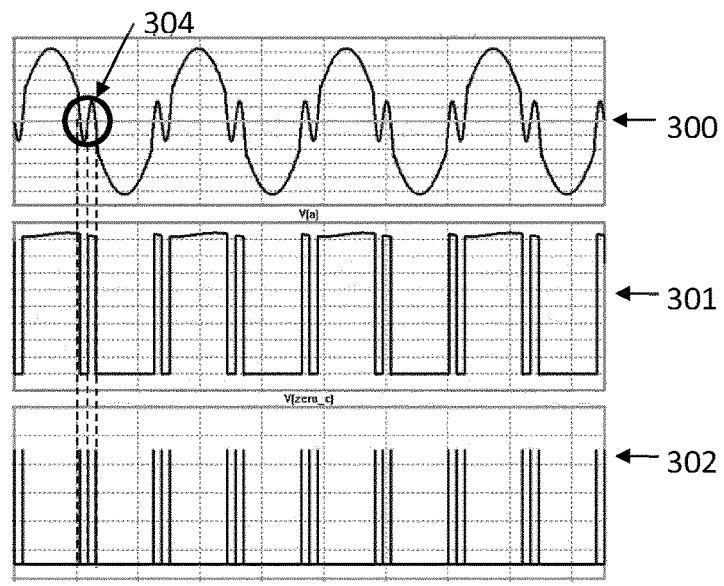
FIG. 4 shows an example of ballast multiple zero crossings.

FIG. 4 shows an example of ballast multiple zero crossings. Often due to the presence of switching components present in the circuit, the input, or ballast current is not a pure sinusoidal waveform. There are often higher order harmonics present in the waveform, which causes small fluctuations in it. Such a waveform is indicated by reference number 300. In particular, it can be seen that there are fluctuations 304 around the zero current value. Such a ringing phenomenon can lead to multiple detections of zero current as shown in waveforms 301, 302. Waveform 301 shows zero cross detection by voltage on the driver input. Waveform 302 shows zero cross detection by current detection. Both are not suitable for stable driver operation. The disturbance is not fixed and is changed by several parameters during operation. Just taking the first zero cross detection is no option for stable driver operation.

Figure 5:
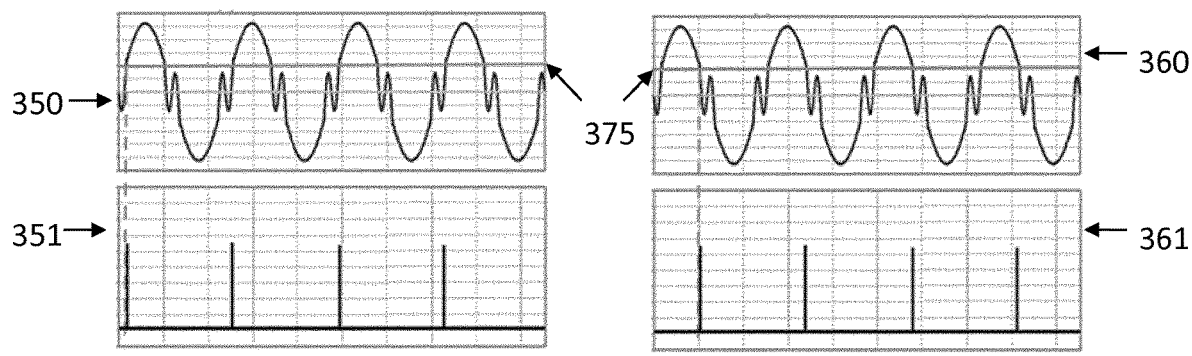
FIG. 5 shows event detection with a current amplitude offset detection.

FIG. 5 shows event detection with a current amplitude offset detection. A solution according to the present disclosure is to employ an event detection with a current amplitude offset detection as shown in waveforms 350, 360. The start for the shunt switch time is generated by the current offset level 375. In the waveform 350, a positive offset 375 is used for the rising edge of the positive ballast current. Complementarily a negative offset is used for the failing edge of the negative ballast current. In this case the shunt time includes the multiple zero crossing times.

In the waveform 360, the positive offset 375 is used for the failing edge of the positive ballast current. (Complementarily a negative offset is used for the rising edge of the negative ballast current). In this case the multiple zero crossing time is excluded from the shunt switch time. Both methods have different result of the ballast/LED driver interaction. To realize this function a comparator can be used to compare the individual MOS FET currents with an offset level. The MOSFET's currents are sensed by the resistors 109, 110 as in FIG. 1. This relative offset level 375 can be made adaptive in such a way that the level stays above the zero cross ringing amplitude in all situations. Waveforms 351 and 361 depict the corresponding zero current detections. The trigger waveforms shown in 351, 361 may be provided to the control circuit controlling the MOSFETs 105, 106.

Figure 6:
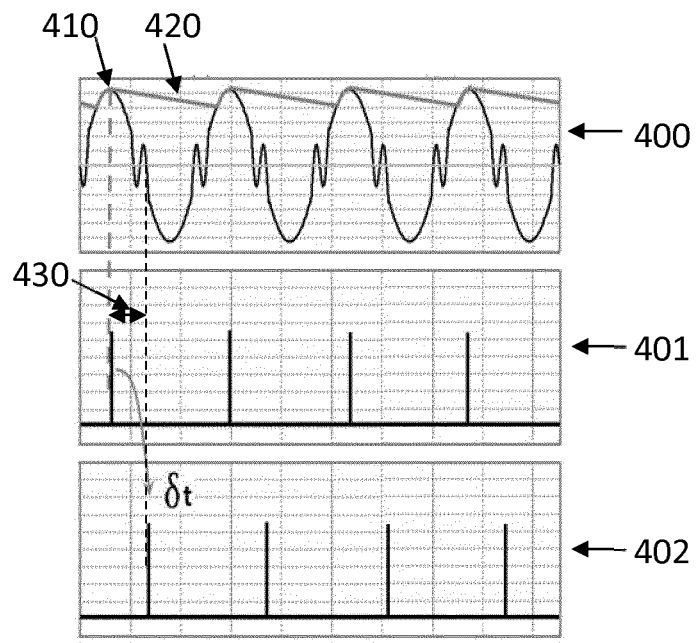
FIG. 6 shows event detection by peak detection and time shifting.

FIG. 6 shows event detection by peak detection and time shifting. Another option to detect a timing event is to employ a peak detection as an alternative to a threshold detection. Such an embodiment is depicted in waveform 400. In order for effective peak detection, the input waveform or the input ballast current may be provided to a capacitor which stores charge. Consequently, the voltage across the capacitor 420 can be used to detect a peak value 410. Once a trigger event is detected as shown in waveform 401, it needs to be shifted in time by a predetermined amount 430 in order to arrive at the waveform according to 402. The predetermined shift in time 430 is dependent on the input frequency of the ballast current, and may be determined separately.

In other words, if the mains frequency is fixed, the time period of the waveform can be calculated in order to determine a time offset 430 between a peak point 410 and a corresponding zero current point. This time offset can be easily implemented in a peak detector circuit in order to obtain accurate zero current timing or a zero crossing timing.

Figure 7:
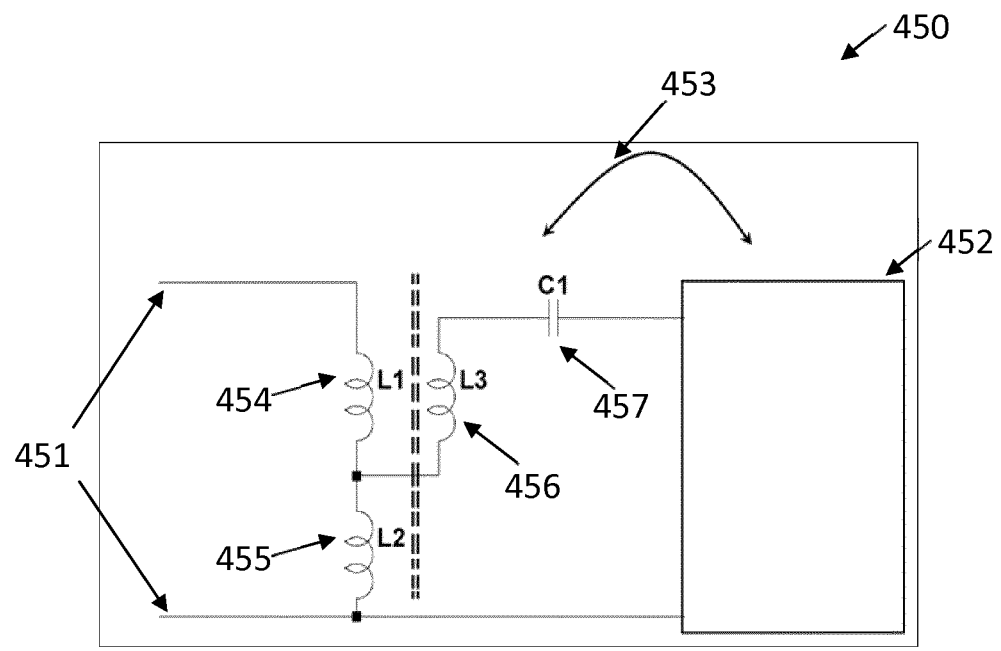
FIG. 7 shows a setup of the ballast and driver.

FIG. 7 shows a setup of the ballast and driver. In the system according to reference numeral 450, the ballast system contains of a transformer and a series capacitor 457. The transformer is a highly non-linear element. The behavior can be modelled as a linear transformer with several saturation effects and non-linear leakage inductances 454, 455, 456. The combination of the series capacitor and transformer forms a LC circuit with resonance frequencies depending on the ballast current and damping factor in the system. The ballast interacts 453 with the shunt switch driver 452 and can result in an un-balanced situation. The input to the ballast system is provided using the input terminals 451.

Figure 8:
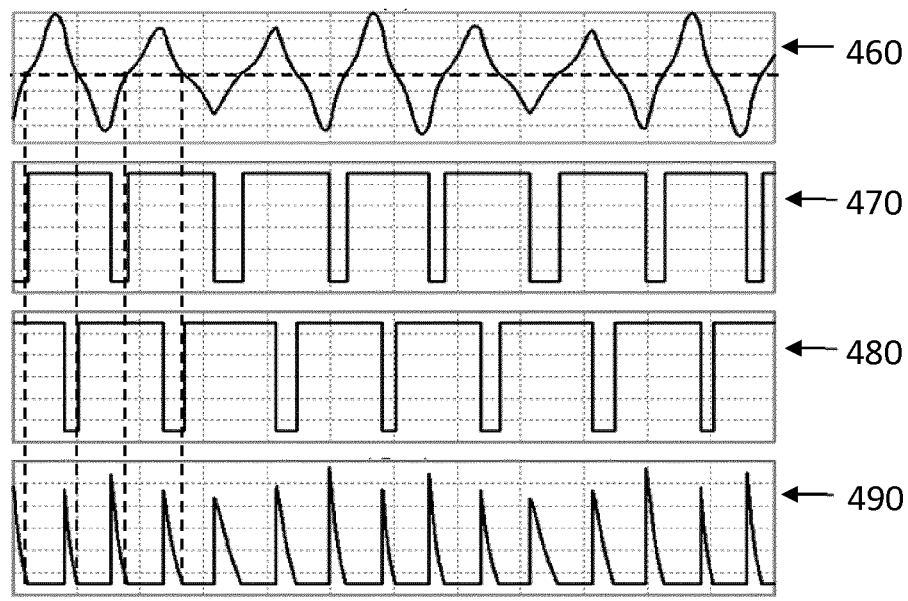
FIG. 8 shows the ballast output current (8a) in an unbalanced situation.

FIG. 8 shows the ballast output current 460 in an un-balanced situation. The On/Off time of the MOSFET gate signals 470,480 varies not only by the half period variation but also the shunt switch event timing is disturbed. This reference timing event distortion avalanches the un-balance in the system. The system is not capable to recover from this undesired operation mode and it results in highly disturbed mains currents. It also results in a high flicker percentage. FIG. 8 shows the current 490 into the LEDs with LED buffer capacitor.

Un-balanced operation can be prevented by a system that reconstructs the original event timing. An average of timing events will prevent the un-balanced operation. Also once a system enters the un-balanced conditions, the event averaging forces the system to a balanced situation.

Figure 9:
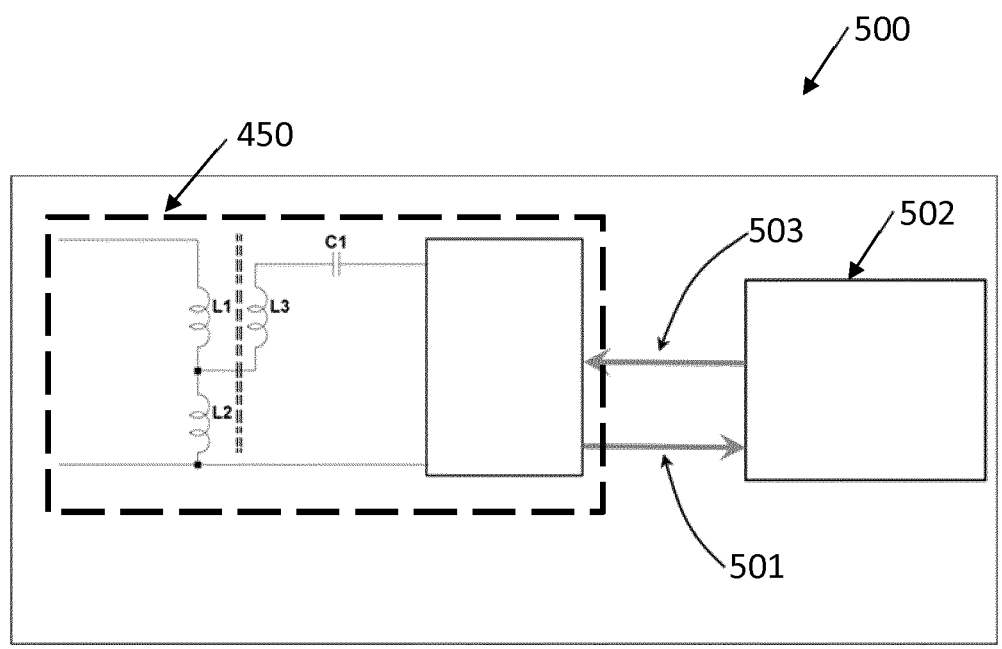
FIG. 9 shows a Phase Locked Loop, PLL, system that reconstructs the timing events and forces the system in a balanced operation mode.

FIG. 9 shows a Phase Locked Loop, PLL, system that reconstructs the timing events and forces the system in a balanced operation mode. Reference numeral 500 indicates a system capable of reconstructing the timing events and forcing the system in a balanced operation mode. Within system 500, system 450 refers to a ballast and driver circuit as shown in FIG. 7. The components therein have been discussed earlier and are not reproduced here once again. Instead, in the present system, the driver provides as its output the detected event 501. The detected event could be for example a zero current detection or a zero crossing detection according to the embodiment discussed with FIG. 5, or a peak detection coupled with a time shifting element according to the embodiment discussed in FIG. 6.

The detected event 501 is provided to an event average system 502. This system could be, for example, a Phase Locked Loop, PLL. The PLL is a control system that generates an output signal whose phase is related to the phase of an input signal. There are several different types; the simplest is an electronic circuit consisting of a variable frequency oscillator and a phase detector in a feedback loop. The oscillator generates a periodic signal, and the phase detector compares the phase of that signal with the phase of the input periodic signal, adjusting the oscillator to keep the phases matched. The event average system then provides an output 503 back to the driver which ensure proper operation of the driver. In an alternate embodiment, the unbalanced current available at the output of the driver may be provide as input 501 to the event average system. In such a case, the event average system 502, provides control signals 503 that drive the unbalanced current to a balanced situation.

Figure 10:
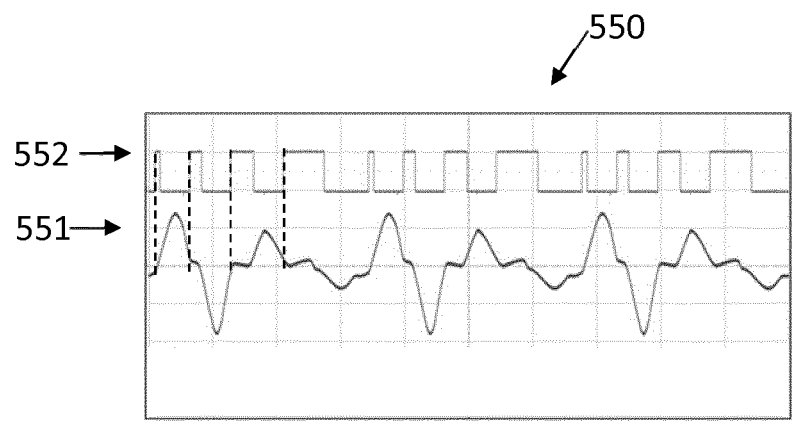
FIG. 10 shows a measured un-balanced ballast current and the zero cross detection without the PLL circuit.

In FIG. 10, reference number 550 shows a measured un-balanced ballast current and the zero cross detection without the PLL circuit. As can be seen from the waveform 551, it depicts an un-balanced ballast current. This current cannot be used as basis for zero current or zero crossing detection for providing timing signals for the control of MOSFET switches. As can be seen from waveform 552, the zero current detection patterns are highly irregular and drive a further imbalance within the system. This is highly undesirable.

Figure 11:
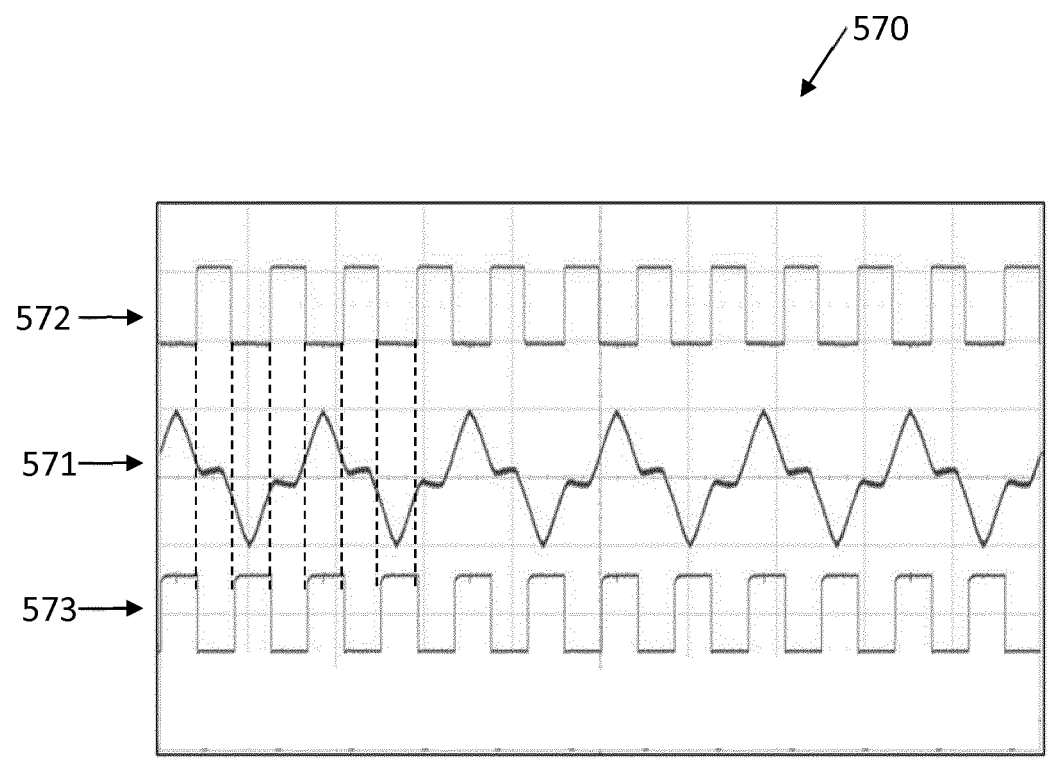
FIG. 11 shows the waveforms corresponding to a balanced ballast operation and the corresponding zero cross detection.

In FIG. 11, reference number 570 shows the waveforms corresponding to a balanced ballast operation and the corresponding zero cross detection. Waveform 571 shows a balanced current waveform that has been made subject to a system as shown in FIG. 9. Since the waveform is balanced, the switching control signals, 572 and 573 are also balanced. Waveform 572 shows a switching control signal for a positive to negative transition of the balanced current waveform 571, and waveform 573 shows a switching control signal for a negative to positive transition of the balanced current waveform 571.

In general, the comparison of the waveform with a threshold may be performed in an analogue manner or a digital manner. The analogue method is highlighted in an exemplary embodiment as shown in embodiment 600 in FIG. 12.

Figure 12:
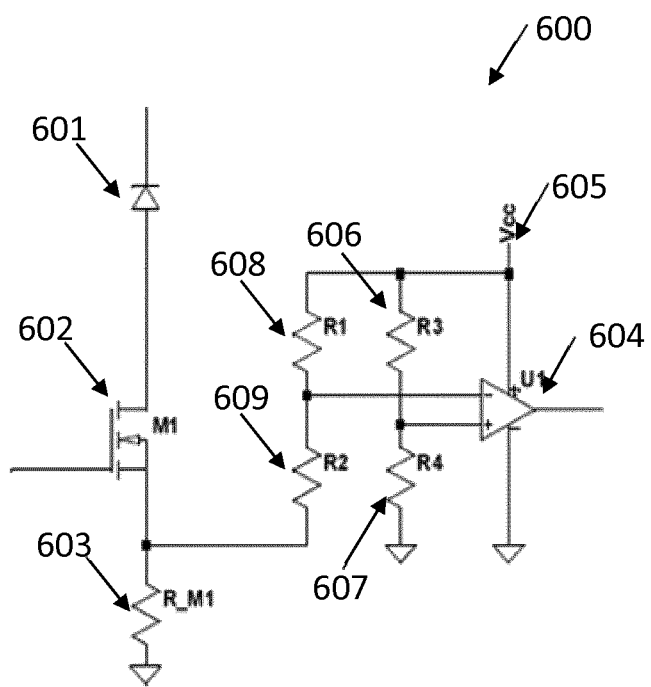
FIG. 12 shows an exemplary embodiment for current offset detection using a single supply comparator.

FIG. 12 shows an exemplary embodiment for current offset detection using a single supply comparator, 604. The components 601, 602, 603 correspond to any one of the legs of a full bridge rectifier or a synchronous rectifier as shown in FIG. 1. For example, the components 601, 602, 603 correspond to either components 103, 105 and 109 or to components 104, 106 and 110. Resistor divider R3, R4 (606,607) creates a zero reference offset to be compatible with positive and negative detected currents over resistor 603. Resistor divider R1, R2 (608, 609) shifts the measured current across 603 like previous R3, R4 (606, 607) but an offset for current offset detection is created by the difference in value R2, 609 and R4, 607. Multiple zero crossings are avoided. By carefully selecting the values of R2, 609, and R4, 607, one can accurately set the threshold required for offset detection. In an example, Both R1, 608, and R3, 606, have a same value of resistance and resistors R2, 609, and R4, 607, have a value of resistance that is in the range of 5-10% of the value of the resistors R1, 608, and R3, 606. As mentioned earlier, the offset for current detection is created by choosing different values for the resistance R2 and R4 that both satisfy the criteria. The absolute value of resistors is also chosen depending on the current flow requirement in correlation with the supply voltage 605. or the maximum current allowable in the circuit.

Figure 13:
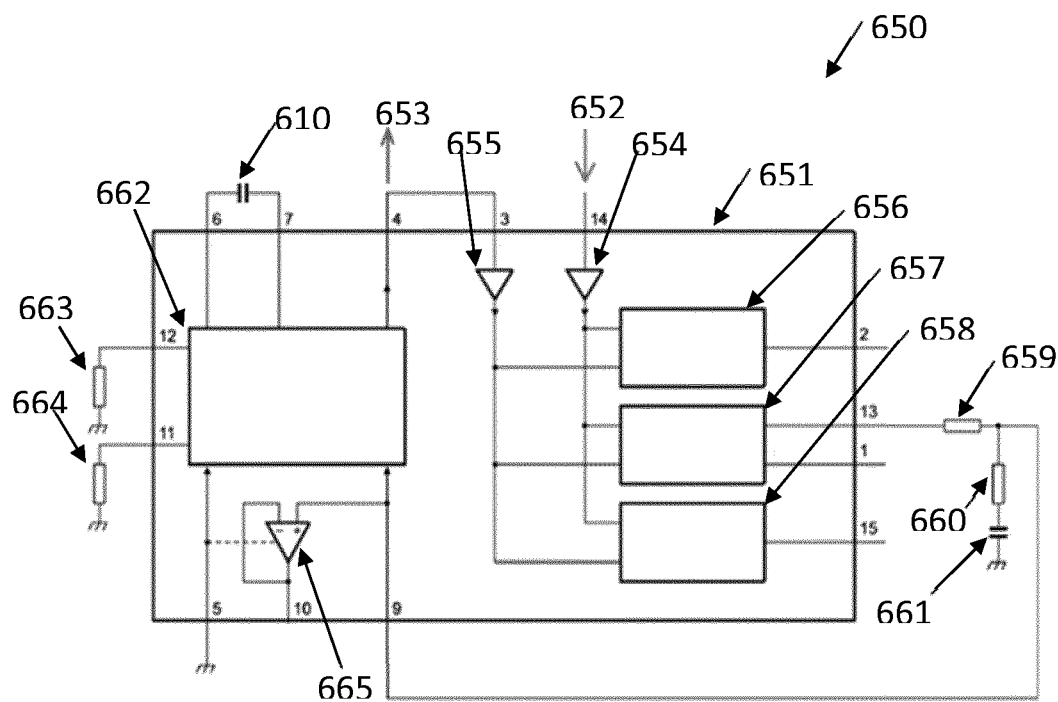
FIG. 13 shows an exemplary embodiment of a PLL circuit using an integrated PLL circuit.

FIG. 13 shows an exemplary embodiment, 650, of a PLL circuit using an integrated PLL circuit. A simple PLL circuit can be implemented with a 74HC4046A integrated PLL circuit 651. (Any other PLL circuit implementation (Integrated or discrete) can be used). The numbers 1 through 14 denote the pin configuration of the aforementioned integrated circuit. It contains a p/f detector (phase/frequency) circuit, 656, 657, 658 and a Voltage Controlled Oscillator, VCO, 662. The output of the p/f detector, as an example p/f detector 657 is used, is filtered by components 659, 660, 661 and added to the VCO, 662 input to close the loop and control the VCO frequency and phase. The zero cross event or the offset event is provided as input to the PLL system, 650 through an input pin 652. The averaged event is available at the output of the system at 653.

Each offset zero cross detection (double line input frequency) is used as input for the p/f detector. The VCO output is a 50% duty cycle square wave signal with edges at the average of the ballast zero cross signal. The ballast is in this way forced to operate in a symmetrical mode.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit Light Emitting Diode, LED, lighting device for connection to a ballast, wherein said ballast is arranged to provide for a ballast current, said retrofit LED lighting device comprising:

at least one LED for emitting light;

a rectifier arranged for rectifying said ballast current and for providing a lamp current to said at least one LED;

a shunt switch for shunting said at least one LED thereby preventing said lamp current to flow through said at least one LED;

a control unit for controlling said shunt switch, wherein said control unit is arranged to:

detect a particular amplitude offset current level in said ballast current, said particular amplitude offset current level being a particular non-zero value of said ballast current;

activate said shunt switch upon said detection, wherein the start for the shunt switch time is generated by the current offset level.

2. A retrofit LED lighting device in accordance with claim 1, wherein said rectifier is arranged to receive an oscillating ballast current, said lighting device further comprising:

an offset generation unit arranged for setting said particular amplitude offset such that said particular amplitude offset current level is between 5%-20%, more preferably between 5%-15%, even more preferably between 5%-10% of an amplitude of said oscillating ballast current.

3. A retrofit LED lighting device in accordance with claim 1, wherein said control unit is further arranged to activate said shunt switch triggered by said detection and by taken into account a predefined delay time, wherein said predefined delay time is based on an expected time difference between 1) a zero-crossing of said ballast current or said lamp current and 2) an expected point in time in which said particular amplitude offset current level is detected.

4. A retrofit LED lighting device in accordance with claim 1, wherein said control unit is further arranged to:

calculate an average period of said ballast current or said lamp current, and activate said shunt switch based on said calculated average period thereby forcing said ballast to operate in a symmetrical mode.

5. A retrofit LED lighting device in accordance with claim 1, wherein said rectifier comprises two diodes in combination with two switches, wherein said control unit is arranged to control said two switches for rectifying said ballast current, and wherein said two switches are further arranged to operate as said shunt switch.

6. A lighting system, comprising:

a retrofit LED lighting device in accordance with claim 1, and a ballast connected to said retrofit LED lighting device.

7. A lighting system in accordance with claim 6, wherein said ballast is an electromagnetic, EM, ballast.

8. A method of operating a retrofit LED lighting device in accordance with claim 1, wherein said method comprises the steps of:

rectifying, by said rectifier, said ballast current and providing a lamp current to said at least one LED;

detecting, by said control unit, a particular amplitude offset current level in one of said ballast current and said lamp current, said particular amplitude offset current level being a particular non-zero value of said ballast current;

activating, by said control unit, said shunt switch triggered by said detection, wherein the start for the shunt switch time is generated by the current offset level.

9. A method of operating a retrofit LED lighting device in accordance with claim 8, wherein said rectifier is arranged to receive an oscillating ballast current, and wherein said lighting device further comprises an offset generation unit, said method comprises the step of:

setting, by said offset generation unit, said particular amplitude offset such that said particular amplitude offset current level is between 5%-20%, more preferably between 5%-15%, even more preferably between 5%-10% of an amplitude of said oscillating ballast current.

10. A method of operating a retrofit LED lighting device in accordance with claim 8, wherein said step of activating comprises:

activating, by said control unit, said shunt switch triggered by said detection and by taken into account a predefined delay time, wherein said predefined delay time is based on an expected time difference between 1) a zero-crossing of said ballast current of said lamp current and 2) an expected point in time in which said particular amplitude offset current level is detected.

11. A method of operating a retrofit LED lighting device in accordance with claim 8, wherein said method further comprises the step of:

calculating, by said control unit, an average period of said ballast current or said lamp current, and activating, by said control unit, said shunt switch based on said calculated average period thereby forcing said ballast to operate in a symmetrical mode.

12. A method of operating a retrofit LED lighting device in accordance with claim 8, wherein said rectifier comprises two diodes in combination with two switches, wherein said control unit is arranged to control said two switches for rectifying said ballast current, and wherein said two switches are further arranged to operate as said shunt switch.

* * * * *